United States Patent [19]

Amano et al.

[11] Patent Number: 4,559,561
[45] Date of Patent: Dec. 17, 1985

[54] TELEVISION RECEIVER

[75] Inventors: Toshio Amano; Daisuke Kozakai, both of Tokyo, Japan

[73] Assignee: Sony Corporation, Tokyo, Japan

[21] Appl. No.: 556,182

[22] Filed: Nov. 29, 1983

[30] Foreign Application Priority Data

Nov. 30, 1982 [JP] Japan .............................. 57-209880

[51] Int. Cl.[4] .............................................. H04N 5/50
[52] U.S. Cl. .................................. 358/192.1; 455/186
[58] Field of Search ............... 358/192.1, 191.1, 193.1, 358/194.1; 455/166, 185, 186

[56] References Cited

U.S. PATENT DOCUMENTS

| | | | |
|---|---|---|---|
| 4,162,513 | 7/1979 | Beyers, Jr. ........................ | 358/192.1 |
| 4,279,035 | 7/1981 | Skerlos .............................. | 358/192.1 |
| 4,291,414 | 9/1981 | Kimura ................................ | 455/186 |
| 4,395,777 | 7/1983 | Oki ...................................... | 455/185 |

Primary Examiner—Tommy P. Chin
Attorney, Agent, or Firm—Lewis H. Eslinger; Alvin Sinderbrand

[57] ABSTRACT

A television receiver having a CPU (central processing unit), a ROM (read only memory) in which a program and a font data are written, and a RAM (random access memory) for work area and a shift register. The font data to be indicated as a channel numeral is loaded to the shift register by an interrupt procedure and the output from the shift register is supplied to the video signal system whereby to indicate the channel numeral after the channel is changed.

4 Claims, 8 Drawing Figures

TELEVISION RECEIVER

BACKGROUND OF THE INVENTION

1. Field of the Invention

The present invention relates generally to a television receiver and more particularly is directed to a television receiver which can indicate the numeral of a channel after the channel is changed.

2. Description of the Prior Art

There is proposed a television receiver in which when a channel is changed, the numeral indicative of the channel after the channel is changed is indicated on the screen of a cathode ray tube during a predetermined period. Such previously proposed television receiver is disclosed in U.S. Pat. No. 3,748,645, U.S. Pat. No. 3,812,285 and so on. A conventional channel indicator used in such television receiver requires a special LSI (large scale integration) chip to indicate the numeral of the channel. However, such LSI chip requires a substantial investment in time and money from its designing to the completion, and when the designing thereof is changed midway, it is quite difficult to cope with such change.

Moreover, it is difficult to give an individuality to the character pattern of the numeral indicating the channel. Furthermore, the number of ICs (integrated circuits) is increased and hence the manufacturing cost is inevitably raised.

OBJECTS AND SUMMARY OF THE INVENTION

Accordingly, it is an object of the present invention to provide an improved television receiver which is free from the problem inherent to the prior art.

It is another object of the present invention to provide a television receiver which can indicate the numeral of a channel after the channel is changed by employing a microcomputer.

It is still another object of the present invention to provide a television receiver in which an individuality can easily be given to the character pattern of the numeral of a channel to be indicated.

It is further object of the present invention to provide a television receiver which can reduce the number of integrated circuits.

According to one aspect of the present invention, there is provided a television receiver comprising:
(a) a central processing unit having an interrupt function;
(b) a bus means connected to said central processing unit;
(c) a read only memory means connected to said central processing unit through said bus means and containing a control program to be executed by said central processing unit;
(d) a random access memory means connected to said central processing unit through said bus means and used as a work area of said central processing unit;
(e) a channel selecting means connected to said central processing unit through said bus means for selecting one of a plurality of channels and producing a video signal; and
(f) a control signal receiving circuit means connected to said central processing unit through said bus means for receiving a control signal and controlling said channel selecting means;

characterized in that said television receiver comprises:
(g) a shift register means connected to said central processing unit through said bus means;
(h) a clock pulse generating means for supplying a clock pulse to said shift register means synchronized with the synchronizing signal of said video signal and generating a serial signal representing a character pattern from said shift register;
(i) a mixing means for mixing said video signal and said serial signal; and
(j) an interrupt means for interrupting an operation of said central processing unit synchronized with a synchronizing pulse of the video signal, said control program in said read only memory means containing a font data to be displayed, a main program for decoding said control signal and controlling said channel selecting means, and an interrupt program for loading the font data from said read only memory means to said shift register means.

The other objects, features and advantages of the present invention will become apparent from the following description taken in conjunction with the accompanying drawings through which the like references designate the same elements and parts.

DESCRIPTION OF THE PREFERRED EMBODIMENT

Now, an embodiment of a television receiver according to the present invention will hereinafter be described with reference to the attached drawings.

Figure 1:
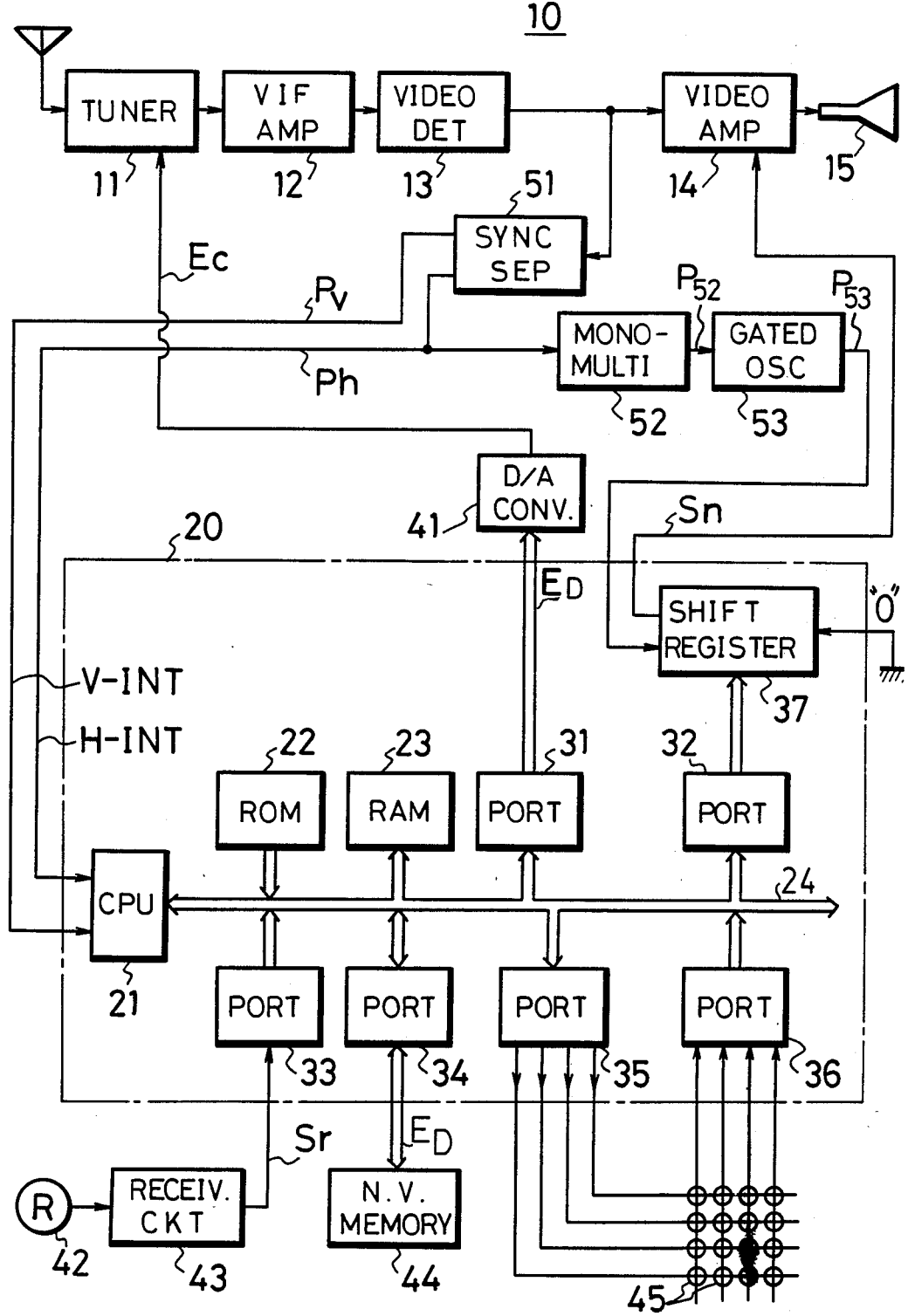
FIG. 1 is a schematic block diagram of an embodiment of a television receiver according to the present invention.

In FIG. 1 showing an example of the present invention, reference numeral 10 generally designates a video signal system, 11 a tuner, 12 a video intermediate frequency (VIF) amplifier, 13 a video detecting circuit, 14 a video amplifier and 15 a cathode ray tube, respectively. In this case, the tuner 11 is formed as an electronic tuning system which can receive the video signal of a desired channel by changing a value of a tuning voltage Ec supplied thereto.

Reference numeral 20 generally designates a microcomputer, 21 a 4-bit parallel CPU (central processing unit), 22 a ROM (read only memory) in which a program and a font data for indicating a numeral of a channel are written or stored, 23 a RAM (random access memory) for a work area and 31 to 36 input/output ports. These circuits 22 to 36 are connected through a bus 24 to the CPU 21.

Reference numeral 37 designates a 16-bit serial/parallel input and serial output shift register. This shift register 37 is used to generate a signal Sn which indicates the numeral of the channel. To the shift register 37 loaded line by line in parallel is a 16-bit font data indicating the numeral of a channel as, for example, shown in FIG. 2 from the port 32. The font data loaded to the shift register 37 is delievered therefrom in series from MSB (most significant bit) as the signal Sn. At that time, the serial input terminal of the shift register 37 is made at "0" level.

The signal Sn derived from the shift register 37 is supplied to the video amplifier 14 in which the signal Sn is composed on or mixed with the video signal.

The microcomputer 20 together with this shift register 37 is formed as one chip IC (integrated circuit).

Reference numeral 41 designates a D/A (digital-to-analog) converter. The output from the port 31 is supplied to this D/A converter 41 from which the tuning voltage Ec is derived. This tuning voltage Ec is supplied to the tuner 11.

Figure 4:
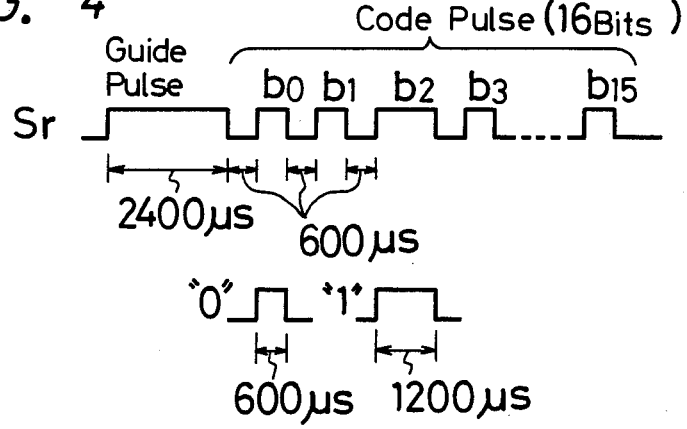
FIG. 4 is a diagram showing the format of a remote control signal used in the present invention.

Reference numeral 42 designates a receiving element which receives a remote control signal and 43 its receiving circuit connected thereto. When the remote control signal is, for example, an infrared remote control signal, the receiving element 42 is formed as an infrared ray receiving element and the receiving circuit 43 generates a remote control signal Sr. This remote control signal Sr is the signal which corresponds to an output from a remote control signal transmitter (not shown) and has a format as, for example, shown in FIG. 4. Namely, in this remote control signal, a guide pulse having a pulse width of 2400 μsec exists in the beginning and code pulses of 16 bits from $b_0$ to $b_{15}$ follow the guide pulse with an interval of 600 μsec. In this case the code pulses $b_0$ to $b_{15}$ indicate "0" or "1" in respose to the content of the remote control. When "0", the pulse width is selected as 600 μsec, while when "1", the pulse width is selected as 1200 μsec. This remote control signal Sr is supplied to the port 33.

Reference numeral 44 designates a non-volatile memory which is connected to the port 34 and in which a digital value of the tuning voltage Ec at each channel is stored. Reference numeral 45 designates an input key which is used to change the channel, the sound volume and so on, in which the dynamic scan is carried out by the output from the port 35, and the switching output from which is inputted to the port 36 to detect which key is operated.

Figure 3:
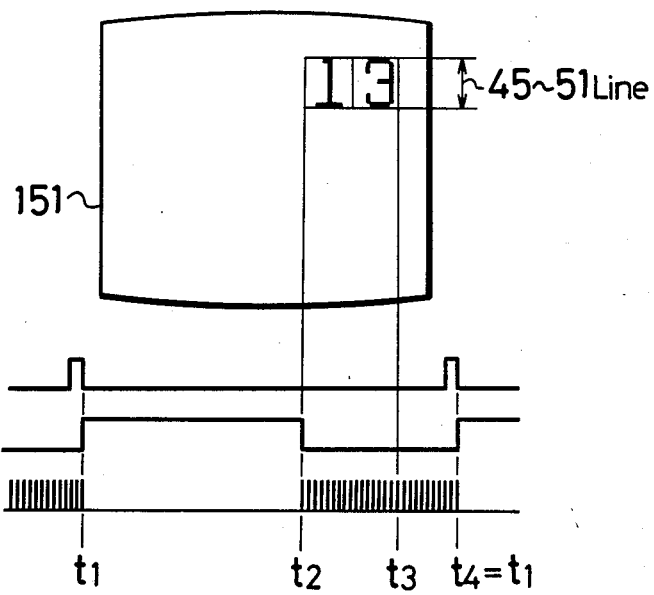
FIG. 3 is a diagram showing a screen of the television receiver of the present invention on which a numeral of channel is indicated and waveforms of pulses used in explanation thereof.

Reference numeral 51 designates a synchronizing (sync) separating circuit to which the video signal from the video detector circuit 13 is supplied and from which a vertical synchronizing pulse Pv and a horizontal synchronizing pulse Ph are derived respectively. These pulses Pv and Ph are supplied to the CPU 21 as interrputing signals H-INT and V-INT. The pulse Ph is supplied to a monostable multivibrator 52 which generates a pulse $P_{52}$ which becomes "1" from a falling down or trailing edge time point $t_1$ of the pulse Ph to a start time point $t_2$ of the display period of the numeral of the channel as shown in FIG. 3 (in which reference numeral 151 designates the screen of the cathode ray tube). This pulse $P_{52}$ is supplied to a gated oscillating circuit 53 as its oscillating control signal so that from the gated oscillating circuit 53 is derived an oscillating pulse $P_{53}$ during the period from $t_2$ to $t_4$ in which the pulse $P_{52}$ is "0" as shown in FIG. 3. This pulse $P_{53}$ is supplied to the shift register 37 as the clock. At that time, the frequency of the pulse $P_{53}$ is selected as a value corresponding to a dot pitch in the lateral direction of the numeral of the channel to be indicated.

Figure 2:
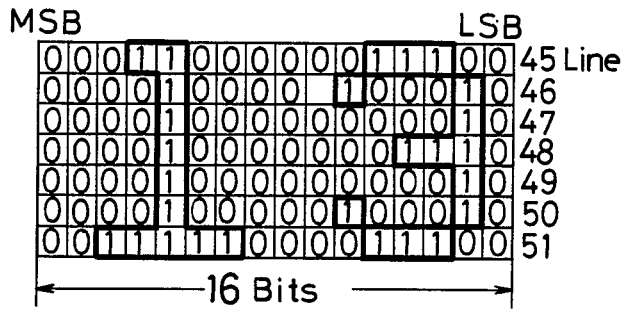
FIG. 2 is a table showing a 16-bit font data used in the present invention.

Accordingly, since the font data on, for example, the first line in FIG. 2 is loaded to the shift register 37 during the first half period from $t_1$ to $t_2$ of the 45th horizontal trace period, this font data is extracted from the shift register 37 as the serial signal Sn in response to the pulse $P_{53}$ during the second half period from $t_2$ to $t_3$ of the above horizontal trace period and then supplied to the video amplifier 14, the numeral of the channel on the first line is indicated on the screen 151 in the interval corresponding to the period from $t_2$ to $t_3$ of the 45th line. Although during the period from $t_3$ to $t_4$ the pulse $P_{53}$ is supplied to the shift register 37, the serial input terminal of the shift register 37 is at "0" level and this "0" level is derived from the shift register 37 during the period from $t_3$ to $t_4$ so that no numeral of the channel is indicated on the screen 151 in the interval corresponding to the period from $t_3$ to $t_4$.

When such operation is performed for the 45th to 51st horizontal lines by employing the font data on the 1st to 7th lines shown in FIG. 2, the channel numeral corresponding to the font data in FIG. 2 is displayed as shown in FIG. 3. If the data of all "0" is loaded to the shift register 37 as the font data, the channel numeral is not indicated.

Figure 5:
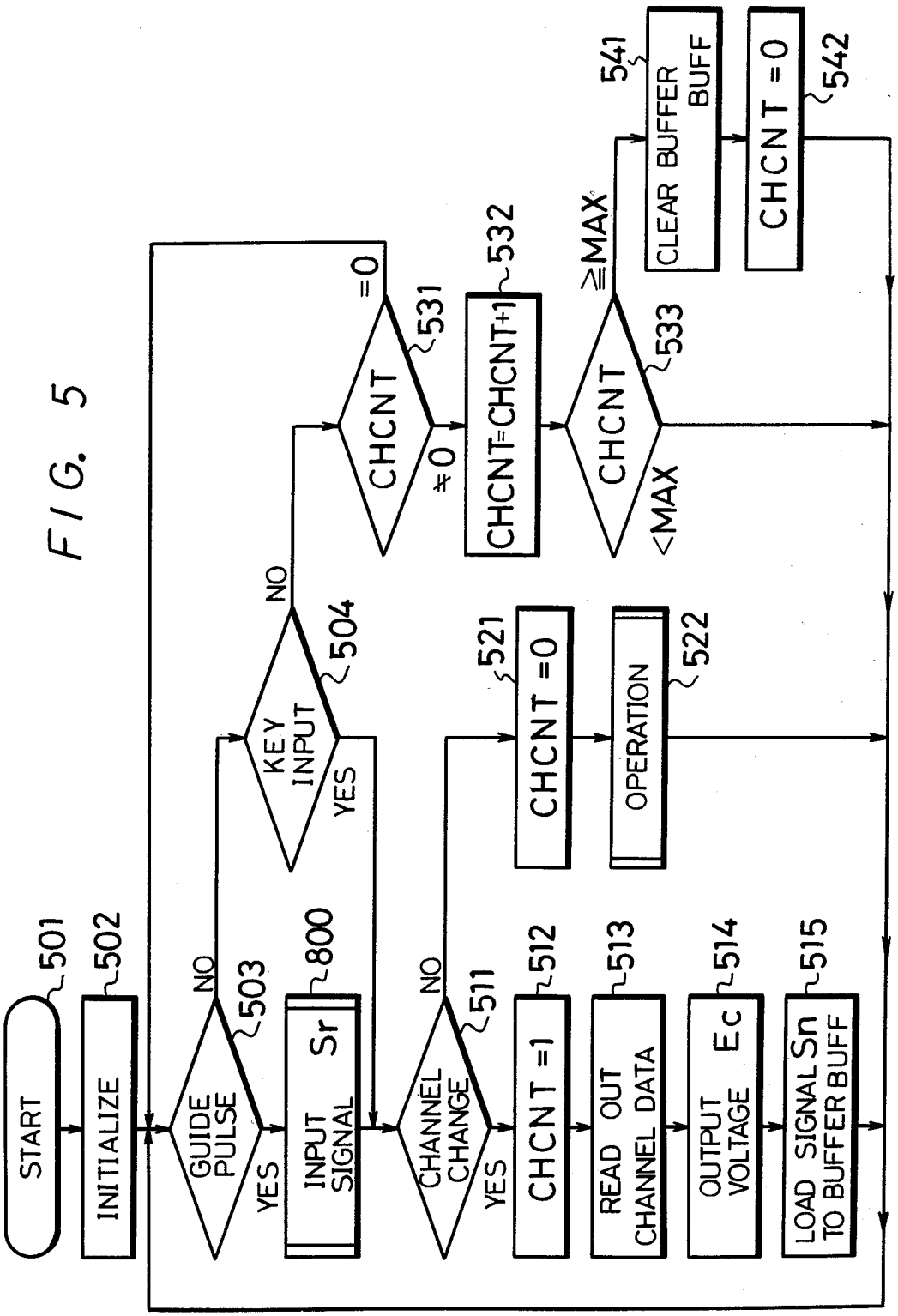
FIGS. 5 to 8 are respectively flow charts used to explain the operation of the present invention.

FIGS. 5 to 8 respectively show flow charts of the programs written in the ROM 22 and FIG. 5 shows the main routine thereof.

This main routine shown in FIG. 5 starts from a step 501 and in a step 502 the initializing is carried out. Thus, a flag FLG, a buffer BUFF and counters CHCNT, HCNT and WCNT are set in, for example, the RAM 23 and these are all reset (cleared) to "0".

A step 503 is such a step in which the existence or not of the remote control signal Sr is judged by the existence or not of the guide pulse, namely, by detecting whether the "1" level of the signal Sr lasts 2400 μsec or not. A step 504 is such a step which judges whether or not there is the input to the key 45, and a step 531 is such a step which judges whether the counter CHCNT is "0" or not. Consequently, when powered, CHCNT=0 is established in the step 502 so that the loop of step 503→step 504→step 531→step 503 is repeated to thereby poll the input of the remote control signal Sr and the input from the key 45. In this case, the counter CHCNT serves as a flag indicative of the existence or not of the request for changing the channel and a timer for setting the displaying period of the channel numeral.

When the remote control signal Sr exists, the bits $b_0$ to $b_{15}$ of the signal Sr are latched in a step 800 and the step is moved to a step 511. Also when an input exists in the step 504, the step 504 moves to the step 511, too. In the step 511, it is judged whether the remote control input in the step 800 and the key input in the step 504 are the commands for changing the channel or not.

When the above inputs are the command for changing the channel, the counter CHCNT is set to "1" in a next step 512. Subsequently, in a step 513, on the basis of the channel data indicated by the remote control signal Sr inputted at the step 800 and the key input in the step 504, a digital tuning voltage data $E_D$ for tuning to the channel is read out from the non-volatile memory 44 (see FIG. 1). This digital tuning voltage data $E_D$ is outputted to the port 31 in a step 514. Thus, by the analog tuning voltage Ec from the D/A converter 41, the television receiver is set in the receiving state of the channel inputted in the step 800 or 504, thereafter.

In a step 515, from the ROM 22, a font data (data as, for example, shown in FIG. 2) displayed as a numeral of a new channel after the channel is changed is loaded to the buffer BUFF. Although the detail will be described later, the font data in the buffer BUFF is sequentially loaded line by line to the shift register 37 during the 45th to 51st horizontal trace period $t_1$ to $t_2$ of each field in accordance with a subroutine 700 shown in FIG. 7. As a result, the channel numeral after the channel is changed is indicated on the screen 151.

When the channel numeral is indicated on the screen 151, the procedure step is returned to the step 503. At that time, since CHCNT=1 is established in the step 512, the procedure step is moved in the order of the step 503→the step 504→the step 531→a step 532. In this step 532, the counter CHCNT is incremented by "1" and in a next step 533, whether the count CHCNT reaches a predetermined value MAX or not is checked where the value MAX is the value corresponding to the period during which the channel numeral is displayed upon changing the channel.

And, if CHCNT<MAX, the processing step 533 returns to the step 503. Accordingly, during the period in which CHCNT<MAX is extablished, the loop of the step 503→the step 504→the step 531→the step 532→the step 533→the step 503 is repeated and at that period, the channel numeral is indicated on the screen 151 (FIG. 3).

When CHCNT=MAX is esbalished, the buffer BUFF is cleared to "0" in a step 541. Therefore, since "0" is loaded through the buffer BUFF to the shift register 37 as the font data, Sn="0" is established thereafter so that the channel numeral is not indicated any more.

In a next step 542, the counter CHCNT is reset to "0" and the procedure step is returned to the step 503.

As described above, when the channel change data is inputted, the channel is changed and the channel numeral after the channel is changed is indicated during a constant period.

When the inputs in the steps 800 and 504 are not the commands for changing the channel but the commands for changing, for example, the sound volume, in a step 521 the counter CHCNT is reset to "0" and then in a step 522, the operation based on the commands inputted in the steps 800 and 504 is carried out. The circuitry for executing the procedure except for changing the channel can be made the same as in the prior art and hence it is omitted to show the same in FIG. 1.

Figure 6:
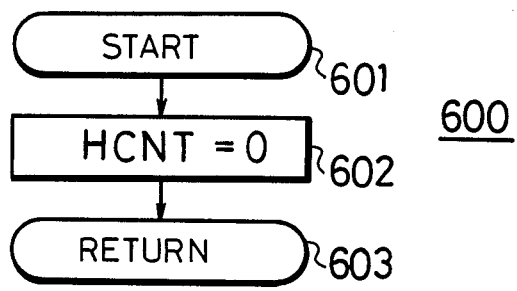
Figure 7:
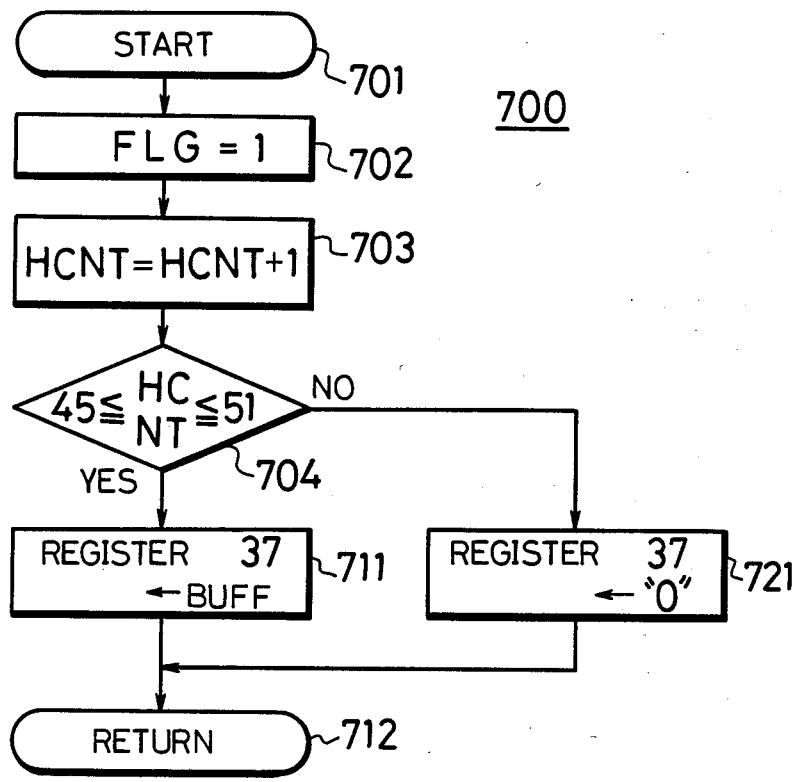

On the other hand, FIGS. 6 and 7 respectively show subroutines in which the font data in the buffer BUFF is loaded to the shift register 37. The subroutine 600 shown in FIG. 6 is the interrupt subroutine which is executed when the interrupt procedure is executed by the vertical synchronizing pulse Pv. When the vertical synchronizing pulse Pv is supplied to the CPU 21, this subroutine 600 starts from a step 601 and in a step 602, the counter HCNT is reset to "0". In a step 603, the subroutine 600 is ended and returned to the original main routine.

Accordingly, by this subroutine 600, the counter HCNT is reset to "0" at every start point of each field.

The subroutine 700 shows in FIG. 7 is the interrupt subroutine which is executed when the interrupt procedure is executed by the horizontal synchronizing pulse Ph. When the horizontal synchronizing pulse Ph is supplied to the CPU 21, the subroutine 700 starts from a step 701 and in a step 702, a flag FLG indicative of whether the subroutine 700 is executed or not is set to "1". Then, in a step 703, the counter HCNT is incremented by "1". In this case, since the counter HCNT is reset to "0" by the subroutine 600 at every start point of each field and the subroutine 700 is executed at each horizontal syncronizing pulse Ph, the counter HCNT indicates the line number of the horizontal line at each field period.

In a next step 704, the magnitude of the counter HCNT is checked. When $45 \leq HCNT \leq 51$, in a step 711, the font data in the buffer BUFF (the data as, for example, shown in FIG. 2) is loaded line by line to the shift register 37 from the buffer BUFF each time when the counter HCNT is incremented by "1" each (at every horizontal lines). On the other hand, when $45 \leq HCNT \leq 51$ is not established, in a step 721, all "0" is loaded to the shift register 37. Then, the subroutine 700 is ended at a next step 712 and returned to the original main routine.

If necessary, the subroutine 700 is provided with a timer routine by which the duration of time necessary for completing the subroutine 700 is set as 40 $\mu$sec (the period shorter than the period from $t_1$ to $t_2$).

Consequently, during the period from $t_1$ to $t_2$ in the 45th to 51st horizontal trace periods, by the subroutine 700 the data in the buffer BUFF is loaded to the shift register 37. Then, if the data loaded to the shift register 37 is the font data, the channel numeral is indicated during the period from $t_2$ to $t_3$. While during the period from $t_1$ to $t_2$ in other horizontal trace period, the data indicative of all "0" is loaded to the shift register 37 from the buffer BUFF so that the channel numeral during the period $t_2$ to $t_3$ is not displayed.

Upon changing the channel, during the predetermined period, the font data regarding the channel numeral after the channel is changed is loaded to the buffer BUFF in the step 515. After that, since the data indicative of all "0" is loaded to the buffer BUFF in the step 541, in accordance with the subroutine 700, during the predetermined period from the change of the channle, the channel numeral after the channel is changed is indicated on the screen 151 as shown in FIG. 3. After the predetermined period elapses, the display is not carried out any more.

Figure 8:
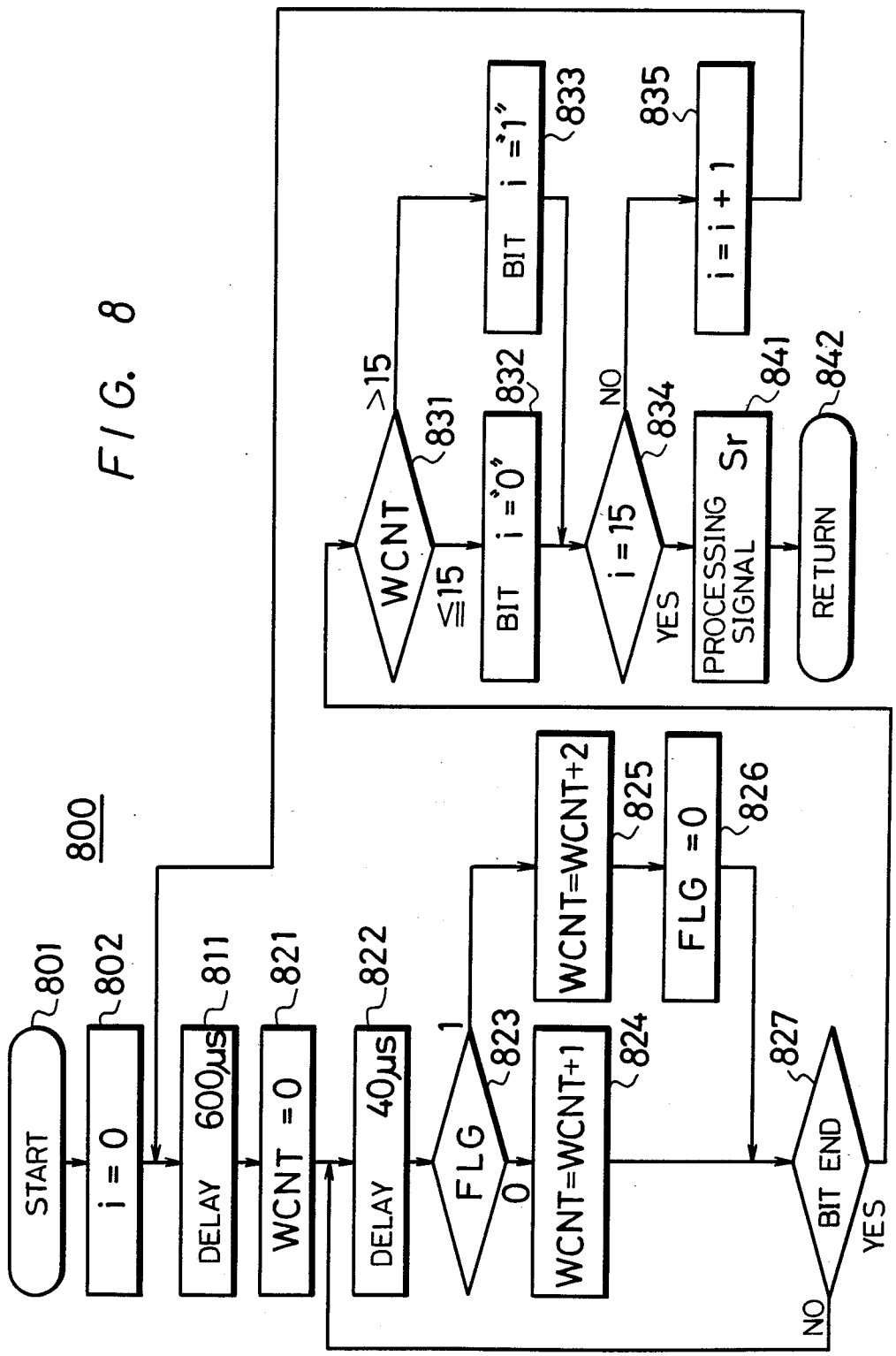

FIG. 8 shows a subroutine 800 which is used to read the remote control signal Sr. This subroutine 800 starts from a step 801. In a next step 802, a pointer i is reset to "0" and in a succeeding step 811, a delay corresponding to the "0" level period of 600 $\mu$sec between the trailing edge of the guide pulse and the rising edge of the bit $b_0$ (see FIG. 4) is carried out. Further, in a next step 821, the counter WCNT is reset to "0". In this case, the pointer i indicates a particular bit of the bits $b_0$ to $b_{15}$ of the remote control signal Sr and i=0 to 15. Also, the counter WCNT is used to check the respective pulse widths of the bits $b_0$ to $b_{15}$.

After the delay of 70 $\mu$sec is performed in a succeeding step 822, whether the flag FLG is "0" or "1" is checked in a next step 823. When FLG=0, namely, the interrupt procedure is not executed, the counter WCNT is incremented by "1" in a following step 824. When FLG=1, namely, the interrupt procedure is executed, the counter WCNT is incremented by "2" in a step 825 and the processing time due to the interrupt procedure is corrected. Thereafter, the flag FLG is reset to "0" in a next step 826. Then, in a step 827, it is checked whether the level of ith bit of the remote control signal Sr reaches the "0" level or not, namely, whether ith bit is ended or not. When ith bit is not ended, the step 827 returns to the step 822, while when ended, the step 827 advances to a step 831.

Accordingly, during the period in which the level of ith bit of the signal Sr is at the "1" level, the loop from the steps 822 to 827 is repeated. Upon repeating the loop from the steps 822 to 827, if the interrupt subroutine 700 is not executed at all, the FLG=0. Therefore, in the steps 822 and 824, the counter WCNT is incremented by "1" each at every 40 μsec. Thus, at the time when the above loop is ended, if ith bit is "0" (namely, the pulse width is 600 μsec), WCNT=15, while if ith bit is "1" (namely, the pulse width is 1200 μsec), WCNT=30 (the processing time necessary for other steps is neglected for simplicity).

Upon repeating this loop from the steps 822 to 827, if the interrupt subroutine 700 is executed, 40 μsec is consumed to execute such subroutine. This is the same as that necessary for executing the step 822 once. Also, at that time, since FLG=1 (step 702), the counter WCNT is incremented by "2" in the step 825. As a result, at the time when this loop is ended, if ith bit is "0", WCNT=15, while if ith bit is "1", WCNT=30.

After the above loop is ended, the counter WCNT is checked in the step 831. If WCNT≦15, the level "0" of ith bit is set in the RAM 23 in a step 832, while if WCNT>15, the level "1" of ith bit is set in the RAM 23 in a step 833. In a next step 834, whether the above procedure is executed for all the bits of the remote control signal Sr or not is checked by the pointer i. When the above procedure is not yet executed for all the bits, the pointer i is incremented by "1" in a step 835 and then the step 835 returns to the step 811. On the contrary, when the above procedure is executed for all the bits, the step 834 advances to a step 841.

In the step 841, the remote control signal Sr is judged on the basis of the data in the steps 832 and 833. And, in a step 842, this subroutine 800 is ended and returned to the original main routine.

As set forth above, according to the present invention, it is possible to perform the change of the channel and to indicate the channel numeral at that time. In this case, particularly in accordance with the present invention, the change of the channel and the indication of the channel numeral after the channel is changed are carried out by the use of the ordinary microcomputer 20 so that the time and cost necessary from designing to completing can be reduced extremely. Moreover, when the designing is changed in the midway thereof, the designing can be changed with ease.

Further, the individuality can be given to the character pattern of the numeral of the channel to be indicated with ease. Also, since the number of the ICs can be reduced, this is advantageous for reducing the manufacturing cost and for increasing reliablity.

In addition, in the above description, it is possible to provide the steps 531 to 542 in the subroutine 600.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A television receiver for receiving a video signal that includes a synchronizing signal, said receiver comprising:
   a central processing unit having an interrupt function;
   bus means connected to said central processing unit;
   read only memory means connected to said central processing unit through said bus means and containing a control program to be executed by said central processing unit;
   random access memory means connected to said central processing unit through said bus means and used as a work area of said central processing unit;
   channel selecting means connected to said central processing unit through said bus means for selecting one of a plurality of channels;
   control signal receiving circuit means connected to said central processing unit through said bus means for receiving a control signal and controlling said channel selecting means;
   shift register means connected to said central processing unit through said bus means;
   clock pulse generating means for supplying a clock pulse to said shift register means synchronized with the synchronizing signal of said video signal and generating a serial signal representing a character pattern from said shift register means; and
   mixing means for mixing said video signal and said serial signal;
   said control program in said read only memory means containing font data to be displayed, a main program for decoding said control signal and controlling said channel selecting means, and an interrupt program for loading the font data from said read only memory means into said shift register means.

2. A television receiver according to claim 1; further comprising an integrated circuit chip, said central processing unit, said bus means, said read only memory means, said random access memory means and said shift register means being formed on said chip.

3. A television receiver according to claim 1; wherein said synchronizing signal includes a horizontal synchronizing pulse, said central processing unit is interrupted by said horizontal synchronizing pulse, and said interrupt program is started by said horizontal synchronizing pulse.

4. A television receiver according to claim 3; wherein a horizontal trace period follows said synchronizing signal and said font data from said read only memory means is loaded into said shift register means during a first portion of the horizontal trace period and said serial signal is generated during a second portion of the horizontal trace period.

* * * * *